Feb. 9, 1926.  1,572,267
F. W. BREHM ET AL
CAMERA HANDLE AND LATCH
Filed March 5, 1924
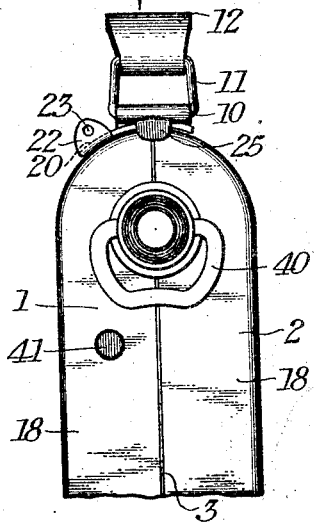
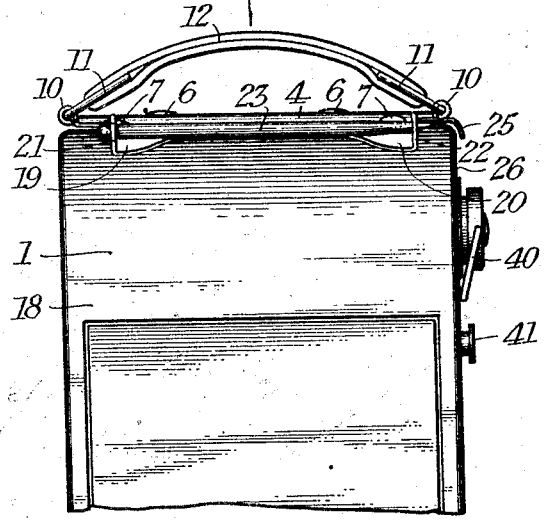
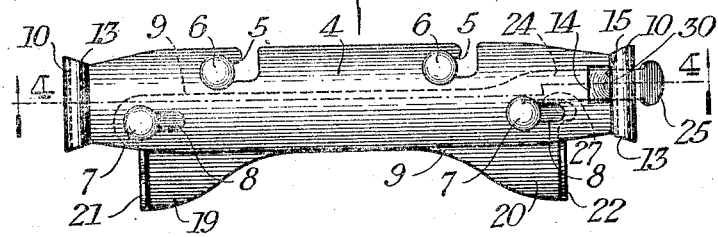
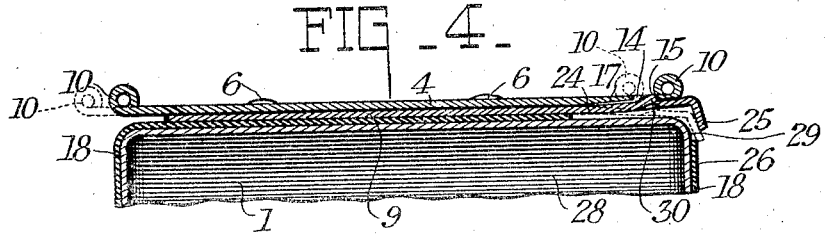
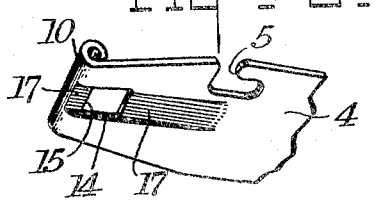
INVENTORS,
Frederick W. Brehm & George W. Adams,
BY
ATTORNEYS.

Patented Feb. 9, 1926.

1,572,267

UNITED STATES PATENT OFFICE.

FREDERICK W. BREHM AND GEORGE W. ADAMS, OF ROCHESTER, NEW YORK, ASSIGNORS TO EASTMAN KODAK COMPANY, OF ROCHESTER, NEW YORK, A CORPORATION OF NEW YORK.

CAMERA HANDLE AND LATCH.

Application filed March 5, 1924. Serial No. 697,139.

*To all whom it may concern:*

Be it known that we, FREDERICK W. BREHM and GEORGE W. ADAMS, citizens of the United States of America, residing at Rochester, in the county of Monroe and State of New York, have invented certain new and useful Improvements in Camera Handles and Latches, of which the following is a full, clear, and exact specification.

This invention relates to photography, and particularly to photographic cameras of the type generally known as hand cameras. It has for its object to provide a simple latching mechanism for holding the camera back on the body; to provide a support for the camera handle; to provide a sliding member for engaging studs to latch the camera parts together; to provide a handle for the camera which will also serve as an operating handle for the sliding member; to provide a simple and positive latch for the sliding member, and to provide a latch member integral with the base upon which the sliding member moves. To these and other ends the invention resides in certain improvements and combinations of parts all as will be hereinafter more fully described, the novel features being pointed out in the claims at the end of the specification.

In the drawing, wherein like reference characters denote like parts throughout,—

Fig. 1 is a side elevation of a portion of a camera having a handle and latch constructed in accordance with and illustrating a preferred form of our invention;

Fig. 2 is a front elevation thereof;

Fig. 3 is a top plan view of the latching member;

Fig. 4 is a section on line 4—4 of Fig. 3, and

Fig. 5 is a fragmentary detail perspective of the lower side of the latching member.

In the present embodiment of our invention we have indicated a camera of well known type consisting of a body 1 having a removable back 2 which separates from the body upon a line 3 drawn through the center of the camera.

To hold the back to the body there is a fastener consisting of a sliding retaining member 4 provided with L shaped notches 5 which engage studs 6 on the camera back 2. These studs form catches for the retaining member. The bar is mounted to slide upon studs 7 which pass through the slots 8, studs 7 passing through a plate 9 into the camera body 1. Bar 4 has the ends 10 formed up to receive the ends of links 11 which carry the handle 12. The ends 10 may be beveled at 13 to cause the links to lie flat against the camera, although this feature forms no part of the present invention, being fully disclosed in U. S. Patent No. 1,459,755, issued June 26, 1923 to C. F. Speidel. At one end of the bar 4 there is an aperture 14 having a straight edge 15; and, as shown in Fig. 5, a wedge shaped groove 17 is cut from the under side across the aperture.

Plate 9 forms a slideway for the retaining member 4 being fastened to the camera body 1 on top of the covering 18 which is usually of leather. Lugs 19 and 20 extend from plate 9 and are bent up at the ends 21 and 22 to receive a stylus 23, such as is commonly used for writing a legend upon the film.

On one end of plate 9 there is a spring arm 24, having a handle 25 bent from the end to lie over the camera side 26. To increase the resiliency of this arm, a slot 27 is cut in the metal, as is shown in Fig. 3. The covering 18 is removed from the camera casing 28 at 29 so as to provide clearance for the spring arm 24 which, by handle 25, may be depressed to the position shown in broken lines, Fig. 4, to release the latching lug 30 from the straight edge 15, after which retaining member 4 by handle 12 may be slid upon studs 7 to release studs 6 from slots 5. Parts 15—30 form a spring latch for positively retaining the retaining member in an operative position, in which the back is held on the camera.

The camera handle 12 is used, of course, for carrying the camera, and also has the additional function of providing a handle by which plate 4 can be slid when latch 15—30 is released. As plate 4 slides to the left (Figs. 2 and 3) it moves away from the snap latch operating handle 25, thus being accessible at all times. Being located on the same side of the camera as the winding key 40, and the bed latch 41, there is no danger of accidentally tripping latch 15—30 by laying the camera down on its side.

While we have shown by way of illustration a preferred embodiment of our invention, we do not wish to be limited to the specific structure shown therein, but contemplate as within the scope of our invention all such forms as come within the scope of the appended claims.

Having thus described our invention, what we claim as new and desire to secure by Letters Patent is:

1. In combination, a two part camera including a camera body and a removable back therefor, a fastener for securing the body and the back together, including a movable retaining member on one part adapted to engage a catch on the other part, and a handle mounted upon one of said parts and adapted to be used for operating the retaining member and for carrying the camera.

2. In combination, a two part camera including a camera body and a removable back therefor, a fastener for holding the parts together, including a movable retaining member and a catch therefor, each located on different parts of the camera, and a single handle mounted upon a fastening member by which the camera may be carried and by which the retaining member may be operated.

3. In combination, a two part camera including a camera body and a removable camera back therefor, a fastener for securing the parts together and a handle for the camera carried by the fastener.

4. In combination, a two part camera including a camera body and a removable camera back therefor, a fastener for securing the parts together, including a retaining member slidably mounted on one part of the camera adapted to engage catches on the other part, and a camera handle mounted on the retaining member.

5. In a camera, the combination with a camera body and a removable back therefor, of means, including a movable retaining member, cooperating with the camera back and body for holding these parts together, and means on one of the camera parts for positively retaining the movable member in a definite position.

6. In a camera, the combination with a camera body and a removable back therefor, of means, including a slidable retaining member mounted on one camera part adapted to cooperate with catches on the other camera part, and a spring latch adapted to engage the slidable retaining member to retain it in a fixed position.

7. In a camera, the combination with a camera body and a removable back therefor, of means, including a slidable retaining member mounted on one camera part adapted to cooperate with catches on the other camera part, a latch for engaging the slidable retaining member to retain it in a fixed position, and an operating handle for the latch for releasing the latch from the retaining member.

8. In a camera, the combination with a camera body and a removable camera back therefor, of a retaining member slidably mounted on one camera part and having a cooperating relation with the other camera part, a base plate attached to a camera part to form a slideway for the retaining member, and a spring latch included on the base plate and cooperating with the retaining member whereby the latter may be latched in a definite position.

9. In a camera, the combination with a camera body and a removable camera back therefor, of a retaining member slidably mounted on one camera part and having a cooperating relation with the other camera part, said retaining member having an operative position in which the camera parts are held together, and a spring latch cooperating with the retaining member to hold it in its operative position.

10. In a camera, the combination with a camera body and a removable camera back therefor, of a retaining member slidably mounted on one camera part and having a cooperating relation with the other camera part, said retaining member having an operative position in which the camera parts are held together, and a spring latch cooperating with the retaining member to hold it in its operative position, a handle for releasing the spring latch, and a handle for the retaining member, whereby the latter handle may be used to move the retaining member from its operative position when the spring latch is released.

11. In a camera, the combination with a camera body and a removable camera back therefor, a perforated retaining member carried by the camera body, a base plate upon which the retaining member is slidably mounted, a latching arm included in the base plate being adapted to lie between the camera body and the retaining member, and having engagement with the perforation in the retaining member, whereby the retaining member may be latched when moved to a position in which the back is held upon the camera body.

12. In a camera, the combination with a camera body and a removable back therefor, of a fastener for holding the parts together, including a slidable retaining member on one part cooperating with catches on the other part, said retaining member having an operative position in which the camera parts are held together, and a latch adapted to hold the retaining member in its operative position, automatically latching the retaining member in its operative position as this member is slid to its operative position.

13. In a camera, the combination with a camera body and a removable back therefor, of a fastener for holding the parts together, including a slidable retaining member on one part cooperating with catches on the other part, said retaining member having an operative position in which the camera parts are held together, and a latch adapted to hold the retaining member in its operative position, automatically latching the retaining member in its operative position as this member is slid to its operative position, said latch having a manually controlled release for freeing the retaining member from the latch.

Signed at Rochester, New York, this 29th day of February, 1924.

FREDERICK W. BREHM.
GEO. W. ADAMS.